Patented Mar. 2, 1954

2,671,084

UNITED STATES PATENT OFFICE 2,671,084

17(20)-OXIDO-3,11a,20-TRIACYLOXY-PREGNANES

Frank H. Lincoln, Jr., and George B. Spero, Kalamazoo, Mich., assignors to The Upjohn Company, Kalamazoo, Mich., a corporation of Michigan No Drawing. Application January 18, 1952,
Serial No. 267,198

10 Claims. (Cl. 260—239.55)

The present invention relates to certain steroid compounds, and is more particularly concerned with the 17(20)-oxido-3,11a,20-triacyloxypregnanes and to a process for the production thereof.

The novel compounds of the present invention may be represented by the formula:

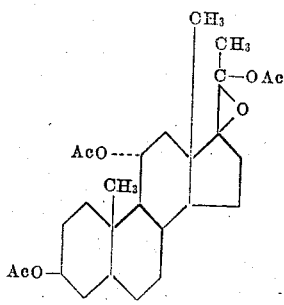

where AcO is an acyloxy group, Ac being the acyl radical of an organic carboxylic acid, especially such acids containing from one to eight carbon atoms, inclusive, and the configuration at the three-carbon atom includes both alpha and beta forms.

It is an object of the present invention to provide a group of novel compounds, the 17(20)-oxido-3,11a,20-triacyloxypregnanes, which have utility in the preparation of biologically active compounds, such as cortisone and its derivatives, and which are also physiologically active per se. A further object of the invention is the provision of a process for the production of the 17(20)-oxido-3,11a,20-triacyloxypregnanes. Other objects of the present invention will be apparent to those skilled in the art to which this invention pertains.

The 17(20)-oxido-3,11a,20-triacyloxypregnanes are useful in the preparation of other steroid compounds having an oxygen atom at carbon atom eleven, such as cortisone acetate, which may be obtained from the 17(20)-oxido-3,11a,20-triacyloxypregnanes by known methods, for example by hydrolysis of the groups at the three, eleven, seventeen, and twenty positions to obtain three, eleven, and seventeen-hydroxyl groups and a twenty-ketone group, oxidation of the three and eleven-hydroxyl groups to ketone groups, introduction of a 21-acetoxy group, and introduction of a double bond at the four position. Such compounds are of particular interest in the field of steroid research due to the biological activity of the cortical hormones and certain known derivatives thereof. The importance of such investigation is moreover emphasized by the shortage of adrenal cortical hormones, and the absence of any present suggestion for the alleviation of said shortage except through organic synthesis.

The 17(20)-oxido-3,11a,20-triacyloxypregnanes which are of particular interest are those compounds of the above generic formula wherein AcO represents an ester of the three, eleven, and twenty-hydroxyl groups with an organic carboxylic acid containing up to and including eight carbon atoms. Among such acids are formic, acetic, propionic, butyric, valeric, hexanoic, heptanoic, octanoic, cyclopentanoic, cyclopentyl-propionic, benzoic, toluic, and the like. Preferred are those ester groups derived from the lower-aliphatic acids, especially those containing from one to eight carbon atoms, inclusive. The acids may also contain substituents, such as halo, alkyl, and methoxy, which are non-reactive under the reaction conditions employed. The three, eleven, and twenty-ester groups may be the same, or two ester groups may be the same and one different, or all three ester groups may be different, depending on the starting materials, since the ester groups of the 17(20)-oxido-3,11a,20-triacyloxypregnanes are unchanged from those in the starting materials.

According to the novel process of the present invention, the 17(20)-oxido-3,11a,20-triacyloxypregnanes are prepared by an oxidation reaction in which an atom of oxygen is added to the 17(20)-ethylenic linkage in a starting 3,11a,20-triacyloxy-17(20)-pregnene. Any oxidant or epoxidizing agent capable of furnishing the necessary oxygen may be employed. The agents most commonly used are the organic peracids or hydrogen peroxide. Organic peracids such as peracetic, perpropionic, perbutyric, perbenzoic, chloroperacetic, and others may be advantageously employed. Concentrated hydrogen peroxide ($H_2O_2$) may likewise be utilized in the form of a twenty to ninety per cent by weight aqueous solution, a thirty per cent solution being preferred. The ratio of oxygen-furnishing agent to starting steroid can be varied considerably within broad ranges. Ratios of up to ten moles or more of the peracid or concentrated hydrogen peroxide to one mole of the starting enol ester are operative, with ratios of from two to about six moles being preferred for attainment of optimum results, the precise ratio being preferably varied inversely with the reaction time employed. The reaction is carried out by mixing together the starting 3,11a,20-triacyloxy-17(20)- pregnene and the peracid of choice, preferably peracetic acid, or hydrogen peroxide for a suitable period, e. g., from about one-half to twenty-four hours, the length of time depending upon the concentration of oxygen-furnishing agent. When the oxidant is hydrogen peroxide, glacial acetic acid is a convenient reaction medium. When a peracid is employed, any of the customary organic solvents in which the starting steroid is soluble can be used, such as chloroform, carbon tetrachloride, ethylene dichloride, methylene chloride, mixtures of ether and chloroform, and others, with chloroform being preferred. It is sometimes desirable to add to the oxidizing medium a small quantity of an alkali metal salt, such as, for example, sodium acetate. Temperatures between about zero and about 100 degrees centigrade can be conveniently used, with room temperature being entirely satisfactory in most cases. In general, if a high temperature is employed, the reaction time may be somewhat reduced. The reaction mixture may be agitated continuously, as, for example, by shaking with a rotary shaking device or other conventional stirring or agitation means. Alternatively, when temperatures above room temperature are employed, the reaction may be conducted on a steam bath.

The 17(20)-oxido-3,11α,20-triacyloxypregnanes can then be isolated in any convenient manner, such as by volatilizing the reaction medium, extracting the residue with chloroform, volatilizing the chloroform, and crystallizing the residue from any organic solvent which is non-reactive with the oxide. Alternatively, the reaction product can be diluted with ether, washed successively with dilute base and water, dried, evaporated to dryness under vacuum, and dissolved in any convenient organic solvent from which the desired compound can be obtained upon crystallization. It is sometimes preferred not to crystallize the product, as the residue obtained after removal of the solvent is of sufficient purity to be used in subsequent reactions. Other recovery procedure includes pouring the reaction product into crushed ice or ice-water, filtering, and drying the precipitate.

The starting 3,11α,20-triacyloxy-17(20)-pregnenes can be produced by various procedures. 3α,11α,20-triacyloxy-17(20)-pregnenes are conveniently prepared by heating 3α,11α-dihydroxypregnane-20-one or a 3α,11α-diacyloxypregnane-20-one, both prepared from progesterone as described below, with a large excess of an organic carboxylic acid anhydride in the presence of an acid catalyst such as sulfuric acid, sulfonic acids and the like, with para-toluenesulfonic acid being preferred. The mixture is heated, usually at about 100 to 180 degrees centigrade, preferably at the boiling point, until the anhydride is nearly completely removed by distillation, which may require a period of about four hours. The rate of distillation may be faster or slower, and any period of about two hours to eight hours or even shorter or longer is operative. If the anhydride used has a high boiling point or is a solid, a suitable solvent such as toluene, xylene, aliphatic hydrocarbons or the like, may be used as a temperature control. The preferred anhydride is acetic anhydride, but other anhydrides, such as propionic, butyric, valeric, hexanoic, heptanoic, and octanoic anhydrides, as well as benzoic acid anhydride, ortho-toluic acid anhydride, and the like are also operative. The acid anhydrides can also be substituted with non-reactive groups, such as halo, alkyl, and methoxy, as in the case of chloroacetic, ortho-toluic, or methoxybenzoic acid anhydrides. Under the conditions of the reaction, hydroxyl groups at carbon atoms three and eleven will be acylated. Starting 3α,11α,20-triacyloxy-17(20)-pregnenes may also be prepared in the same manner from 11α-acyloxy-3α-hydroxy-pregnane-20-ones, also prepared from progesterone as described below.

The 3α,11α-dihydroxypregnane-20-one, 3α,11α-diacyloxypregnane-20-ones, and 11α-acyloxy-3α-hydroxypregnane-20-ones are prepared from progesterone by the following reactions. Progesterone is oxidized to 11α-hydroxyprogesterone by a fermentation process more fully described in Preparation 1. The 11α-hydroxyprogesterone is reduced with hydrogen in ethanol using a palladium-charcoal catalyst to give 11α-hydroxypregnane-3,20-dione. Reduction of the 11α-hydroxypregnane-3,20-dione with sodium borohydride in dioxane gives the desired 3α,11α-dihydroxypregnane-20-one. Acylation of the 11α-hydroxypregnane-3,20-dione with an acylating agent, for example, an acid anhydride, such as acetic anhydride, to give an 11α-acyloxypregnane-3,20-dione, followed by reduction of the 11α-acyloxypregnane-3,20-dione with sodium borohydride in dioxane gives the desired 11α-acyloxy-3α-hydroxypregnane-20-one. Subsequent acylation of the 11α-acyloxy-3α-hydroxypregnane-20-one with an acylating agent, for example, an acid anhydride, such as acetic anhydride, produces the desired 3α,11α-diacyloxypregnane-20-one.

Starting 3β,11α,20-triacyloxy-17(20)-pregnenes may be prepared from 11α-acyloxy-3β-hydroxypregnane-20-ones in the same manner as described above for the preparation of 3α,11α,20-triacyloxy-17(20)-pregnenes from 11α-acyloxy-3α-hydroxypregnene-20-ones. The 11α-acyloxy-3β-hydroxypregnene-20-ones are prepared by catalytic reduction of 11α-acyloxypregnane-3,20-diones, prepared from progesterone as described above, using hydrogen and a Raney nickel catalyst.

The following examples are illustrative of the process and products of the present invention, but are not to be construed as limiting.

*Preparation 1.—11α-hydroxyprogesterone*

To four liters of a 32–48 hour growth of culture RH 176 (*Rhizopus arrhizus* strain) was added one gram of progesterone in fifty milliliters of acetone, providing a suspension of the steroid in the water of the culture. The culture was then incubated at room temperature for 48 hours. At the end of this time the pH of the medium was 3.5 and the fermentation liquor and mycelia were extracted successively with three one-liter portions, one two-liter portion, and one one-liter portion of methylene chloride. The methylene chloride extracts were combined and washed with two 400-milliliter portions of two per cent aqueous sodium bicarbonate solution and three 500-milliliter portions of water. The metylene chloride extract was evaporated to dryness in vacuo and the solids taken up in fifty milliliters of methylene chloride. The solution was transferred to a 100-milliliter beaker and evaporated by a stream of air. The solids, weighing 1.585 grams, were dissolved in five milliliters of hot methanol and allowed to cool slowly at room temperature, whereupon 75 milligrams of crystals separated out. The mother liquor was freed of solvent by aeration, dissolved in fifty milliliters of benzene, and chromatographed over alumina ($Al_2O_3$).

Fifty grams of acid-washed alumina, dried at 45 degrees centigrade, was used as adsorbent and 100-milliliter portions of solvents were used to develop the column. The solvents and the order used were as follows: benzene, benzene, benzene plus 5 per cent ether, benzene plus 5 per cent ether, benzene plus 10 per cent ether, benzene plus 10 per cent ether, benzene plus 10 per cent ether, benzene plus 50 per cent ether, benzene plus 50 per cent ether, ether, ether, ether plus 5 per cent chloroform, ether plus 5 per cent chloroform, ether plus 10 per cent chloroform, ether plus 10 per cent chloroform, ether plus 50 per cent chloroform, ether plus 50 per cent chloroform, chloroform, chloroform, chloroform plus 5 per cent acetone, chloroform plus 5 per cent acetone, chloroform plus 10 per cent acetone, chloroform plus 10 per cent acetone, chloroform plus 50 per cent acetone, chloroform plus 50 per cent acetone, acetone, acetone, acetone plus 5 per cent methanol, acetone plus 5 per cent methanol, acetone plus 10 per cent methanol, acetone plus 10 per cent methonal, acetone plus 50 per cent methanol, acetone plus 50 per cent methanol. The chloroform and chloroform plus 5 per cent acetone eluates were combined, evaporated to dryness, and the residue dissolved in two milliliters of hot methanol and filtered. After overnight refrigeration, 171 milligrams of crystalline 11α-hydroxyprogesterone, melting at 166 to 167 degrees centigrade, was obtained. A recrystallized sample gave the following constants: melting point, 166–167 degrees centigrade; $[\alpha]_D^{20}$ plus 175.9 degrees (chloroform).

Analysis.—Per cent calculated for $C_{21}H_{30}O_3$: C, 76.4; H, 9.10. Found: C, 76.6; H, 8.92.

The structure of this product was further established by its conversion, with chromic acid in acetic acid, to 11-keto-progesterone [Reichstein, Helv. Chim. Acta. 23, 684 (1940); ibid 26, 721 (1943)].

*Preparation 2.—11α-hydroxypregnane-3,20-dione*

A solution of 250 milligrams of 11α-hydroxyprogesterone from Preparation 1 in 100 milliliters of ethanol containing six drops of triethylamine was subjected to hydrogenation at room temperature under a pressure of about ten pounds of hydrogen in the presence of 45 milligrams of a thirty per cent palladium-charcoal catalyst in a Parr apparatus with an auxiliary mercury manometer. The time required for the hydrogenation was about twenty minutes. The reaction mixture was filtered and the solvent was evaporated to yield 265 milligrams of material melting at 145–185 degrees centigrade. This product was extracted with a mixture of one milliliter of ether and nine milliliters of Skelly Solve B. On standing, the extract deposited eighty milligrams (32 per cent) of 11α-hydroxypregnane-3,20-dione as feathery needles which melted at 85–90 degrees centigrade. Recrystallization from a mixture of about six drops of ethyl acetate and five milliliters of Skelly Solve B did not change the melting point.

Analysis.—Per cent calculated for $C_{21}H_{32}O_3$: C, 75.86; H, 9.70. Found: C, 76.13; H, 9.63.

*Preparation 3.—3α-11α-dihydroxypregnane - 20 - one*

To a solution of 5.31 grams of 11α-hydroxypregnane-3,20-dione of Preparation 2 in 130 milliliters of peroxide-free dioxane maintained at fifty degrees centigrade in a water bath was added a solution of 195.5 milligrams of sodium borohydride (assay 84 per cent) in five milliliters of water. The mixture was stirred for one hour at fifty degrees centigrade, filtered, acidified with three normal aqueous hydrochloric acid solution and evaporated under reduced pressure. The residue was crystallized from fifty milliliters of ethyl acetate to give 1.95 grams (36 per cent) of 3α,11α-dihydroxypregnane-20-one, which melted at 180–182 degrees centigrade. An additional 0.2 gram melting at 181–183 degrees centigrade was obtained from the filtrate; total yield, 2.15 grams (40 per cent).

*Preparation 4.—11α-acetoxypregnane-3,20-dione*

A mixture of 70.5 milligrams of 11α-hydroxypregnane-3,20-dione from Preparation 2, 0.8 milliliter of acetic anhydride, and 0.7 milliliter of pyridine was allowed to stand for 16 hours at room temperature and then poured into ice water. The precipitated product was isolated by filtration and dried. The yield of 11α-acetoxypregnane-3,20-dione melting at 143.5–146.5 degrees centigrade was 67 milligrams (84 per cent). After one recrystallization from ether-Skelly Solve B, the melting point was 150–151 degrees centigrade; $[\alpha]_D^{23}=$ plus 63 degrees (c=0.803 in chloroform).

Analysis.—Per cent calculated for $C_{23}H_{34}O_4$: C, 73.76; H, 9.15. Found: C, 73.93; H, 9.32.

*Preparation 5.—11α - acetoxy - 3α - hydroxypregnane-20-one*

To a solution of 200 milligrams (0.534 millimole) of 11α-acetoxypregnane-3,20-dione from Preparation 4 dissolved in ten milliliters of peroxide-free dioxane at fifty degrees centigrade was added dropwise with stirring a solution of 6.9 milligrams (0.152 millimole based on pure reagent) of sodium borohydride (assay 83.5 per cent) in one milliliter of water. The mixture was stirred at fifty degrees centigrade for one hour and acidified by pouring into fifty milliliters of water containing hydrochloric acid. The oil which first separated crystallized on standing. The solid was collected, washed with water, and dried under reduced pressure at fifty degrees centigrade. The yield of 11α-acetoxy-3α-hydroxypregnane-20-one melting at 122–136 degrees centigrade was 156 milligrams. The crude product was dissolved in fifteen milliliters of benzene and chromatographed over 7.5 grams of acid-washed alumina which had been dried at 120 degrees centigrade. The column was developed with two fifteen-milliliter portions of each of the following seventeen solvents: benzene, benzene and 5, 10, and 50 per cent ether, ether, ether and 5, 10, and 50 per cent chloroform, chloroform, chloroform and 5, 10, and 50 per cent acetone; acetone and 5, 10, and 50 per cent methanol, and methanol. The product appeared from fraction 12 (ether and 5 per cent choloroform) through fraction 22 (chloroform and 10 per cent acetone). Combination of these fractions and recrystallization from ethyl acetate-Skelly Solve B gave 93 milligrams of product melting at 140–143 degrees centigrade. Two further recrystallizations from isopropyl ether gave pure 11α-acetoxy-3α-hydroxypregnane-20-one melting at 146–148 degrees centigrade.

Analysis.—Per cent calculated for $C_{23}H_{36}O_4$: C, 73.4; H, 9.64. Found: C, 73.8; H, 9.61.

*Preparation 6.—3α,11α-diacetoxypregnane-20-one*

Using the procedure described in Preparation 4, the 11α-acetoxy-3α-hydroxypregnane-20-one from Preparation 5 was esterified with acetic anhydride in pyridine to yield 3α,11α-diacetoxypregnane-20-one.

*Preparation 7.—3α,11α,20-triacetoxy-17(20)-pregnene*

Four hundred and five (405) milligrams of 3α,11α-dihydroxy-pregnane-20-one from Preparation 3, 200 milligrams of paratoluenesulfonic acid monohydrate and seventy milliliters of acetic anhydride were heated to distillation temperature and allowed to distill slowly for three and one-half hours. A total of sixty milliliters of distillate was collected. The residue was cooled to room temperature, poured into ice-water and the resulting crystalline product collected and washed with water. Recrystallization from acetone-water yielded 332 milligrams of 3α,11α,20-triacetoxy-17(20)-pregnene, melting at 200–203 degrees centigrade.

*Preparation 8.—3α,11α,20-triacetoxy-17(20)-pregnene*

Using the same procedure as in Preparation 7, 1.0 gram of 3α,11α-diacetoxypregnane-20-one from Preparation 6 was treated with 0.45 gram of para-toluenesulfonic acid and 100 milliliters of acetic anhydride. The yield of 3α,11α,20-triacetoxy-17(20)-pregnene was 0.7 gram, melting at 200–210 degrees centigrade. A sample recrystallized for analysis from acetone-hexane and from alcohol melted at 211–213 degrees centigrade; $[\alpha]_D^{24}$ minus 16 degrees (chloroform).

*Analysis.*—Per cent calculated for $C_{27}H_{40}O_6$: C, 70.4; H, 8.75. Found: C, 70.55; H, 8.79.

*Preparation 9.—3α,11α,20-triacetoxy-17(20)-pregnene*

Using the same procedure as in Preparation 7, 2.42 grams of 11α-acetoxy-3α-hydroxypregnane-20-one from Preparation 5 was treated with 1.06 grams of para-toluenesulfonic acid and 240 milliliters of acetic anhydride. The yield of 3α,11α,20-triacetoxy-17(20)-pregnene was 1.54 grams, melting at 203–208 degrees centigrade.

*Preparation 10.—3α,11α,20-tripropionoxy-17(20)-pregnene*

Using the procedure described in Preparation 7, 3α,11α-dihydroxypregnane-20-one from Preparation 3 is converted to 3α,11α,20-tripropionoxy-17(20)-pregnene with propionic anhydride in the presence of para-toluenesulfonic acid.

*Preparation 11.—3α,11α,diacetoxy-20-propionoxy-17(20)-pregnene*

Using the procedure described in Preparation 8, 3α,11α-diacetoxypregnane-20-one from Preparation 6 is converted to 3α,11α-diacetoxy-20-propionoxy-17(20)-pregnene with propionic anhydride in the presence of para-toluenesulfonic acid.

*Preparation 12.—3β,11α,20-triacetoxy-17(20)-pregnene*

Using the procedure described in Preparation 9, 3β-hydroxy-11α-acetoxypregnane-20-one (prepared by the reduction of the 11α-acetoxypregnane-3,20-dione of Preparation 4 with hydrogen at two to three atmospheres pressure in methanol at room temperature using a Raney nickel catalyst), is converted to 3β,11α,20-triacetoxy-17(20)-pregnene with acetic anhydride in the presence of para-toluenesulfonic acid.

In the same manner as given above, other 3α (or 3β), 11α,20-triacyloxy-17(20)-pregnenes are prepared, including 3β,11α,20-tripropionoxy-17(20)-pregnene; 3β,11α-diacetoxy-20-propionoxy-17(20)-pregnene; 3α,20-dipropionoxy-11α-acetoxy-17(20)-pregnene; 3β,11α20-trioctanoyloxy-17(20)-pregnene; 3α,20-dioctanoyloxy-11α-propionoxy-17(20)-pregnene; 3α-benzoyloxy-11α-acetoxy-20-butyroyloxy-17(20)-pregnene; 3α,11α-diacetoxy-20-benzoyloxy-17(20)-pregnene; 3α,11α,20-tributyroyloxy-17(20)-pregnene; 3α,11α,20-trivaleroyloxy-17(20)-pregnene; 3α,11α,20-trihexanoyloxy-17(20)-pregnene; 3α,11α,20-triheptanoyloxy-17(20)-pregnene, and 3α,11α,20-trioctanoyloxy-17(20)-pregnene.

*Example 1.—17(20)-oxido-3α,11α,20-triacetoxypregnane*

One and one-half grams of 3α,11α,20-triacetoxy-17(20)-pregnene (from Preparation 7, 8, or 9) was dissolved in 7.5 milliliters of chloroform, and the solution was cooled in an ice bath to about five degrees centigrade. Three and three-tenths milliliters of commercial grade forty per cent peracetic acid solution in which 100 milligrams of sodium acetate had been dissolved was added, and the resulting mixture was then shaken on a mechanical shaking machine for about two hours at room temperature to complete the reaction. The mixture containing the crude product was diluted with fifty milliliters of methylene chloride and then washed with several 25-milliliter portions of ice-cold five per cent aqueous sodium hydroxide solution followed by 25-milliliter portions of water until the wash solution was neutral to pH test paper. The neutral solution was dried with anhydrous sodium sulfate and then filtered to remove the drying agent. The white crystalline residue obtained on evaporating the solvent from the clear, dry solution melted at 210–213 degrees centigrade. Recrystallization from a mixture of ethyl acetate and Skelly Solve B gave fluffy needles of 17(20)-oxido-3α,11α,20-triacetoxypregnane melting at 214–217 degrees centigrade.

*Analysis.*—Per cent calculated for $C_{27}H_{40}O_7$: C, 68.04; H, 8.46. Found: C, 68.33; H, 8.62; C, 67.90; H, 8.38.

*Example 2.—17(20)-oxido-3α,11α,20-triacetoxypregnane*

One gram of 3α,11α,20-triacetoxy-17(20)-pregnene (from Preparation 7, 8, or 9) was dissolved in fifteen milliliters of benzene and five milliliters of a two-molar solution of perbenzoic acid in benzene was added. After standing at room temperature for two hours to complete the reaction, the solution was diluted with thirty milliliters of benzene. The crude 17(20)-oxido-3α,11α,20-triacetoxypregnane, melting at 211–214 degrees centigrade, was obtained using the same procedure for isolation as in Example 1.

*Example 3.—17(20)-oxido-3α,11α,20-tripropionoxypregnane*

Using the procedure described in Example 1, 3α,11α,20-tripropionoxy-17(20)-pregnene from Preparation 10 is converted to 17(20)-oxido-3α,11α,20-tripropionoxypregnane by oxidation with peracetic acid in the presence of sodium acetate.

*Example 4.—3α,11α-diacetoxy-17(20)-oxido-20-propionoxypregnane*

Using the procedure described in Example 2, 3α,11α-diacetoxy-20-propionoxy-17(20)-pregnene from Preparation 11 is converted to 3α,11α - diacetoxy - 17(20) - oxido - 20 - propionoxypregnane by oxidation with perbenzoic acid.

*Example 5.—17(20)-oxido-3β,11α,20-triacetoxypregnane*

Using the procedure described in Example 1, 3β,11α,20-triacetoxy-17(20)-pregnene from Preparation 12 is converted to 17(20)-oxido-3β,11α,20-triacetoxypregnane by oxidation with peracetic acid in the presence of sodium acetate.

*Example 6.—17(20)-oxido-3β,11α,20-triacetoxypregnane*

Using the procedure described in Example 2, 3β,11α,20-triacetoxy-17(20)-pregnene from Preparation 12 is converted to 17(20)-oxido-3β,11α,20-triacetoxypregnane by oxidation with perbenzoic acid.

In the same manner as given above, other 17(20)-oxido-3α (or β), 11α,20-triacyloxypregnanes are prepared, including 17(20)-oxido-3β,11α,20-tripropionoxypregnane; 3β,11α - diacetoxy-17(20)-oxido-20-propionoxypregnane; 11α-acetoxy - 3α,20 - dipropionoxy - 17(20) - oxidopregnane; 17(20) - oxido - 3β,11α - trioctanoyloxypregnane; 3α,20-dioctanoyloxy-17(20)-oxido-11α-propionoxypregnane; 11α-acetoxy-3α-benzoyloxy-20-butyryloxy-17(20)-oxidopregnane; 20-benzoyloxy - 3α,11α - diacetoxy - 17(20) - oxidopregnane; 17(20)-oxido-3α,11α,20-tributyryloxypregnane; 17(20)-oxido-3α,11α,20-trivaleryloxypregnane; 17(20)-oxido-3α,11α,20-trihexanoyloxypregnane; 17(20)-oxido-3α,11α,20-triheptanoyloxypregnane; 17(20)-oxido-3α,11α,20-trioctanoyloxypregnane, and the like.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A 17(20)-oxido-3,11α,20-triacyloxypregnane, wherein the acyloxy groups have the formula AcO, Ac being the acyl radical of a hydrocarbon carboxylic acid containing from one to eight carbon atoms, inclusive.

2. A 17(20)-oxido-3,11α,20-triacyloxypregnane, wherein the acyloxy groups have the formula AcO, Ac being the acyl radical of a hydrocarbon carboxylic acid containing from one to eight carbon atoms, inclusive, and wherein the acyloxy groups at carbon atoms three, eleven, and twenty are derived from the same organic carboxylic acid.

3. A 17(20)-oxido-3,11α,20-triacyloxypregnane, wherein the acyloxy groups have the formula AcO, Ac being the acyl radical of a hydrocarbon carboxylic acid containing from one to eight carbon atoms, inclusive, and wherein the acyloxy groups at carbon atoms three, eleven, and twenty are derived from two different organic carboxylic acids.

4. A 17(20)-oxido-3,11α,20-triacyloxypregnane wherein the acyloxy groups have the formula AcO, Ac being the acyl radical of a hydrocarbon carboxylic acid containing from one to eight carbon atoms, inclusive, and wherein the acyloxy groups at carbon atoms three, eleven, and twenty are derived from three different organic carboxylic acids.

5. A 17(20) - oxido - 3α,11α,20 - triacyloxypregnane wherein the acyloxy groups have the formula AcO, Ac being the acyl radical of a hydrocarbon carboxylic acid containing from one to eight carbon atoms, inclusive, and wherein the acyloxy groups at carbon atoms three, eleven, and twenty are derived from the same organic carboxylic acid.

6. A 17(20) - oxido - 3β,11α,20 - triacyloxypregnane wherein the acyloxy groups have the formula AcO, Ac being the acyl radical of a hydrocarbon carboxylic acid containing from one to eight carbon atoms, inclusive, and wherein the acyloxy groups at carbon atoms three, eleven, and twenty are derived from the same organic carboxylic acid.

7. 17(20)-oxido-3α,11α,20-triacetoxypregnane.

8. 17(20) - oxido - 3α,11α,20 - tripropionoxypregnane.

9. 3α,11α - diacetoxy - 17(20) - oxido - 20 - propionoxypregnane.

10. 17(20) - oxido - 3β,11α,20 - triacetoxy - 17(20)-pregnane.

FRANK H. LINCOLN, Jr.
GEORGE B. SPERO.

References Cited in the file of this patent
UNITED STATES PATENTS

| Number | Name | Date |
|---|---|---|
| 2,265,143 | Butenandt | Dec. 9, 1941 |
| 2,577,777 | Levin | Dec. 11, 1951 |